July 14, 1970 O. THIEME ETAL 3,520,721
THIN-LAYERED ELECTRICAL PRINTED CIRCUITS
AND METHOD OF MANUFACTURING
Filed Aug. 30, 1967

INVENTORS
OTTO THIEME et al 3,520,721

THIN-LAYERED ELECTRICAL PRINTED CIRCUITS AND METHOD OF MANUFACTURING

Otto Thieme, Bad Klosterlausnitz, and Jürgen Henneberger and Hannes Tieze, Hermsdorf, Thuringia, and Siegfried Schiller and Ullrich Heisig, Dresden, Germany, assignors to VEB Keramische Werke Hermsdorf, Hermsdorf, Germany Filed Aug. 30, 1967, Ser. No. 664,446
Int. Cl. H01b *1/02*; B44d *1/18*
U.S. Cl. 117—212 23 Claims

ABSTRACT OF THE DISCLOSURE

Electrical thin film circuit and resistance combination wherein the conductors, contact surfaces and capacitor electrodes are formed from a single composition of an iron/nickel alloy of from 45–50% iron and 55–50% nickel by vapor depositing said composition in one or more vapor-depositing operations in a vacuum on an electrically non-conductive substrate which is at a temperature of approximately 300° C.

The invention relates to electrical thin film circuits and to a method for manufacturing, preferably on flat, electrically non-conductive substrates, such as glass, ceramic or plastic material.

The manufacture of passive electrical thin film circuits on such substrates is known and takes place in a vacuum, in general, by way of vapor-deposition operations which take place either sequentially or simultaneously. In order to provide such thin film circuits with resistances, capacitances, and even inductances, various layers with different configurations, compositions and thicknesses are deposited in a sequence of operations. With active thin film circuits (having semi-conductor elements such as transistors, etc.), semi-conductive layers are used. For the resistances, layers of nickel/chrome alloys, for example, are generally used, with the percentage relationship between the components of the alloy being adapted to the particular requirements of the circuit. It is also known to use metal/ceramic compounds. The resistance layers are generally heated after being deposited. This takes place most frequently in an atmosphere containing oxygen. Through these operations the layer is formed, and by directing oxygen thereto a definite oxidation of the uppermost region of the layer is achieved. This latter operation is in general characterized as annealing.

In order to form the required conductors and contact surfaces, materials such as gold, aluminum, copper, or nickel are generally used. For the manufacture of capacitors, three layers are required, two electrodes and a dielectric situated therebetween. For the electrode material, gold or aluminum are most frequently used. The dielectric is manufactured by vapor-deposition or by other methods, such as, for example, oxidation proceses.

It is known to vapor-deposit the resistances of nickel/chrome alloy on the substrate while the latter is at an elevated temperature for the purpose of securing a good adhesion and a good reproduceability of the layer structure. The latter temperature of the substrate is about 300° C. It is known that this nickel/chrome alloy achieves a good adhesion. This adhesion is assumed to result from the chrome-oxide skin which forms.

This known effect of adhesion is used for the manufacture of thin film circuits where the conductors, contact surfaces and electrodes for the capacitors are provided with an under-layer of chrome or chrome alloy. Where a nickel/chrome alloy is used as a resistance layer, then the resistance paths are provided in the same vapor-depositing operation and the sub-layering for the capacitor electrodes is also carried out. Such a method, however, has the disadvantage of requiring complex masking structures. It is possible to avoid this disadvantage by providing separate vapor-depositing of the adhesion layer for the electrodes and of the resistance layers.

Likewise, aluminum is very frequently used as the material for the electrodes, conductors, and contact surfaces, since layers of aluminum have a good adhesion without any underlayers and by the formation of an oxide skin a suitable material for the base electrodes of the capacitors is achieved.

The sub-layering of electrodes, conductors and contact surfaces with chrome or chrome alloy has the disadvantage of resulting in high costs because of the additional vapor-depositing and complex masking operations. The use of aluminum avoids these disadvantages but requires a large cost in the manufacture of contacts, since aluminum cannot be provided to any practical extent with contacts (coating of solder) in a tin-containing bath.

In the manufacture of thin film circuits it is often required that one or more layers, particularly the resistance layers, be controlled during the vapor-deposition since the thickness of the layer determines, by measurement, its electrical resistance. Thus, it is required that before depositing the layers whose thickness is to be controlled by electrical measurement, contact surfaces be deposited so that contact pins can be placed on these contact surfaces.

It is known to use vapor-deposited layers of aluminum of gold for these contact surfaces. With this construction difficulties are encountered primarily by the destruction of the contact surfaces when the latter are engaged by the contact points. Therefore, these contact surfaces, which are also known as so-called monitor contacts, are frequently achieved by other processes, such as, for example, by burning of silver or by electro-plating, before the actual manufacture of the thin film circuit on the substrate is carried out.

Manufacture of thin film circuits with capacitors frequently requires in addition to the monitor contacts, conductors, contact surfaces and resistances, and three additional vapor-depositing operations. For the electrodes of the capacitors it is necessary to use materials and layers which provide the electrodes with a relatively small surface resistance and which enable the capacitors to be cured. This curing signifies that in the case of a short circuit of the capacitor, the short circuit can be eliminated by localized vaporization of the electrode layers around the short circuit location.

Besides the vacuum operations, the manufacture of thin film circuits requires additional operations which do not take place in a vacuum and which are carried out either between or after various vacuum operations. Such a sequence of operations is therefore considered incompatible. One such operation is, for example, the annealing of resistance layers in an oxygen-containing atmosphere. Such an operation has the disadvantage of requiring the thin film circuit which is being manufactured to be brought into the atmosphere between vapor-depositing operations.

It is a primary object of the present invention to provide a method which will eliminate the difficulties encountered in the adhesion of layers and in the provision of contacts, and to provide, without sub-layering, simple solderable contacts and conductors while minimizing the number of process steps which are required.

It is also an object of the present invention to provide with a minimum number of steps a simplified compatible process for manufacturing electrical thin film circuits where only a single material is used for the conductors, the contact surfaces, as well as for the monitor contacts and capacitor electrodes, with relatively low surface resistance, this material being capable of good adhesion to a conventional substrate without sub-layering while at the same time being easily solderable, without wetting the resistance layers, and while forming a good oxide skin for the manufacture of the capacitors.

It is also an object of the present invention to provide the layers for the conductors, etc., with contacts by simple immersion in solder or by other soldering methods, the immersion taking place in baths which contain a substantial amount of tin.

The objects of the invention are achieved by providing, in accordance with the invention, for the conductors, the contact surfaces, and the base and covering electrodes of the capacitors a single iron/nickel material whose composition is approximately in the ratio of 45–50% iron to 50–55% nickel, while vapor-depositing this material in a manner known per se in one or more vapor-depositing operations in a vacuum on a substrate which is a temperature of approximately 300° C. It is desirable that the iron/nickel alloy be introduced while in a heated condition at a temperature of from 150° to 300° C. with oxygen.

After depositing, in any sequence, the layer of an alloy of nickel/chrome for the resistances and the layers of iron/nickel alloy, in a vacuum or in a predetermined atmosphere, it is of advantage to heat the substrate in an oxygen-containing atmosphere to a temperature of 150–400° C. As a result of this heating in the oxygen-containing atmosphere, an oxidation of the layer is achieved. By known means, such as suitable liquid solvents medium, the oxide layer can be removed from the iron/nickel alloy. For example, a soldering tincture for heavy metal consisting of an alkali hydroxide or alkali carbonate dissolved in an alcohol may be used as a suitable solvent medium.

It is furthermore advisable to provide the iron/nickel layer which is to be coated, preferably wth a solder containing a substantial amount of tin, with a minimum vapor-deposited layer thickness of 120 nm. (nanometer) where an annealing operation is carried out, and in the case where the annealing operation is omitted, the minimum thickness of the vapor-deposited layer should be in the region of 90–120 nm.

For the manufacture of contact surfaces for the monitor leaf, it is preferable also to use iron/nickel alloys.

Furthermore, it is of advantage to deposit on the covering electrode of the capacitor's layers which are not wetted by a solder.

According to a further embodiment of the invention, for the manufacture of thin film circuits having capacitors, the resistance layers are preferably made of nickel/chrome alloy, after the layers for the conductors, contact surfaces, the base electrode, the dielectric, and the covering electrode of the capacitors have been deposited. The masking of the vapor-deposition for the nickel/chrome alloy is then carried out in such a way that the covered electrodes of the capacitors are also covered by a nickel/chrome layer.

Finally, it is advisable when carrying out the layering operations in a vacuum, to carry out the tempering operation as the last of the vacuum operations or subsequent to and directly after the vacuum operations.

Tests have indicated that where the ratio of the iron to nickel alloy is changed in the composition to, for example, below 45% such as to 40% iron and 60% nickel, there is a very substantial reduction in the adhesion quality. Likewise a reduction in the desirable properties during immersion soldering are encountered where ratio of iron in the alloy composition is changed to more than 50%, for example, to approximately 55% iron and 45% nickel.

The above iron/nickel alloy of the invention has the additional advantage of having a thermal expansion coefficient which is in the region of nickel/chrome alloy, which is used for the resistance layers most frequently. In this way, mechanical stresses between the layers and tearing away of layers are avoided. Because of this it is possible to anneal the substrate of the invention with the deposited layers of iron/nickel alloy and nickel/chrome alloy thereon at a relatively high temperature in the region of 150°–400° C. This annealing takes place in a high vacuum or also very frequently in a predetermined oxygen-containing atmosphere. The resulting oxide layer of iron/nickel oxide can then be removed by known liquid solvent mediums before the immersion soldering takes place. Tests have shown that for the iron/nickel layer a minimum vapor-deposited thickness of approximately 120 nm. is required so that after the annealing it is still capable of being soldered. As a result of the far lesser thickness of the oxide layer, where the annealing is omitted, the minimum vapor-deposited thickness in this latter case is less and is in the range of 90–120 nm.

A further advantage of the invention resides in the possibility of achieving annealable capacitors as well as monitor contacts by direct vapor deposition on the substrate. The monitor contacts are not destroyed by the pressure of the contact points and are capable of being electrically contacted.

According to another embodiment of the invention, the formation of a favorable oxide layer for the base electrode of the capacitor is brought about by directing oxygen, after vapor deposition, against the hot iron/nickel layer, primarily at 200–300° C.

For more detailed understanding of the invention, and by way of illustration and not limitation, reference is made to the accompanying drawings, in which.

Figure 1:
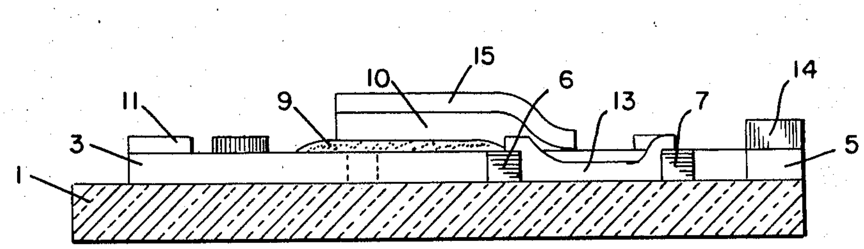
FIG. 1 is a side elevation of a thin film circuit situated on a glass substrate in accordance with the invention.
Figure 2:
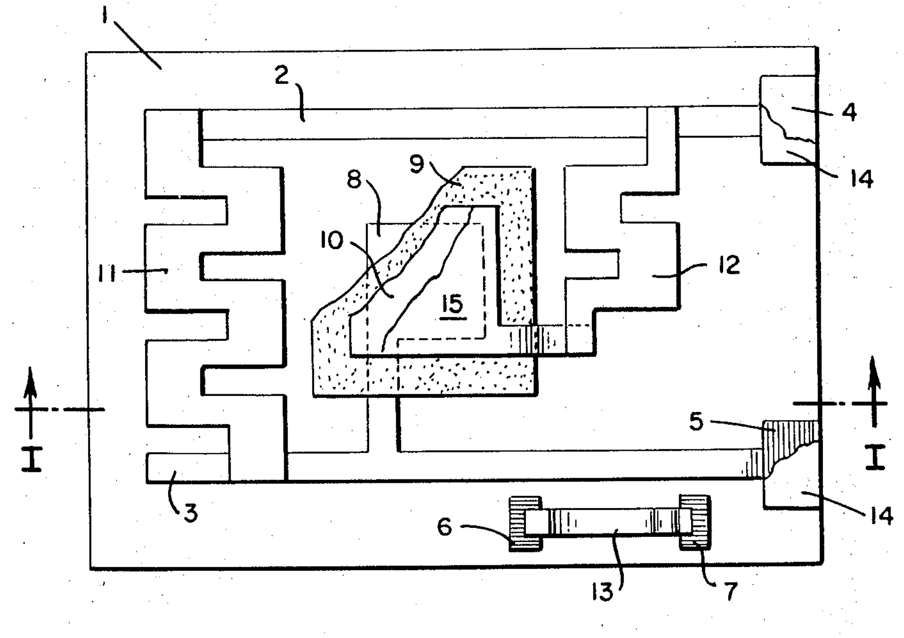
FIG. 2 is a top plan view partly in section of the thin film circuit of FIG. 1.
Figure 3:
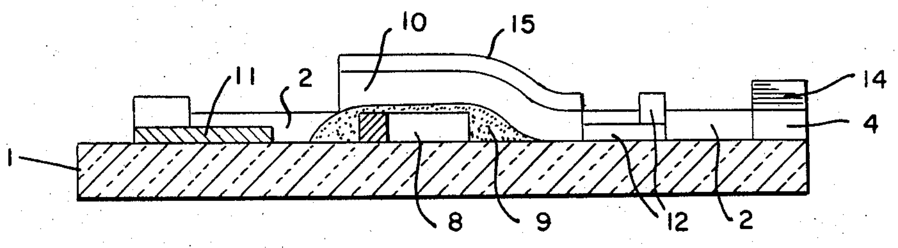
FIG. 3 is a longitudinal sectional view taken along line I—I of FIG. 2 in the direction of the arrows.

Referring now to the drawings, there is initially vapor deposited on the substrate 1, made of glass, the conductors 2, 3, the contact surfaces 4, 5, 6, 7, and the base eletrode 8 for a capacitor. A low-alkali hardened glass is a suitable material for the substrate. It is also possible to use for the substrate a ceramic sublayer or a plastic carrier. For example, it is possible to use for the substrate aluminum oxide or polytetrafluoroethylene. The conductors 2, 3, the contact surfaces 4, 5, 6, 7 and the base electrode 8 are made of an iron/nickel alloy having approximately 50% iron and 50% nickel. Then the dielectric layer 9 is vapor-deposited. In a further operation the covering electrode 10 of the capacitor is vapor-deposited. This covering electrode 10 also is made of an iron/nickel alloy. In a further vapor-depositing operation the layers for the resistances 11, 12 and the monitor leaf 13 are manufactured. The resistances 11, 12 and monitor leaf 13 are made of a known nickel/chrome alloy.

The iron/nickel alloy which is vapor-deposited at approximately 300° C. and which has the composition of 50% iron and 50% nickel has been discovered to have such a good adhesion that it is capable of being strongly stressed in a mechanical manner with measuring points, without being damaged. There are also provided small transition resistances. During the manufacture of the resistances, these layers are therefore suitable to function as monitor contacts or small monitor plates so that it is possible to measure and control, by means of comparison resistances, the surface resistance during the vapor-deposition of the conductive and semi-conductive layers.

The manufacture of a thin-film circuit made up of a pair of resistances 11, 12 and a capacitor takes place according to the following method:

The substrate 1 is brought into a vaporizing chamber in which a pressure of $5 \cdot 10^{-5}$ to $10^{-4}$ torr prevails. In front of the substrate 1 there is a mask of predetermined structure provided with cutouts so that the conductors 2, 3, the contact surfaces 4, 5 and 6, 7, and the base electrode 8 of the capacitor may be vapor-deposited. This first step of process of vapor-deposition of an iron/nickel alloy of preferably 50% iron and 50% nickel lasts for approximately one minute with a substrate temperature of 200–250° C. In the next step of the process the dielectric 9, for example silicon dioxide, is vapor-deposited on the base electrode 8 with another mask in the same vacuum and at the same temperature region. This step lasts for some ten minutes. The third step serves for the vapor-deposition of the covering electrode 10 onto the dielectric 9 under the same conditions and with the same materials as during the first step of the process, but with another mask of a different construction. In the next following step of the process, after changing the masks, the resistances 11 and 12 are vapor-deposited simultaneously with a small monitor plate 13, which acts as a monitor resistance, between the monitor contacts 6 and 7. A material suitable for this purpose is a chrome/nickel alloy of a known alloy construction corresponding to the value of the resistance. This part of the process lasts for 0.5–1 minute at a pressure of $5\cdot10^{-5}$–$10^{-4}$ torr in the vaporizing chamber with the substrate temperature of approximately 300° C. During this process measuring tips are pressed against the monitor contacts 6, 7 and measure, by means of a potential applied to one of these tips, the resistance of the vapor-deposited layer. This value is in a known way continuously compared with a comparison resistance, and a suitable bridge connection provides, upon attainment of a predetermined value, a signal for interrupting the vapor-deposition by a diaphragm. The small monitor plate 13 now has its predetermined value corresponding to the thickness of the layer. The entire resistance layer has a unitary surface resistance over its defined structure. As a result of the structure of the masks of the resistances, the individual resistances 11 and 12 have the predetermined value. Finally, the contact surfaces 4, 5 and 6, 7 and the conductors 2, 3 and tinned by immersion into a suitable bath.

In another embodiment, the thin film circuit with the resistances and capacitors is manufactured in the following manner.

On the substrate 1 there is initially also vapor-deposited, as in the above example, an iron/nickel alloy for the conductors 2, 3, the contact surfaces 4, 5, 6, 7, the monitor leaf 13 and the base electrode 8. Then the resistance layers of a nickel/chrome alloy are vapor-deposited. Thereafter the substrate 1 with the vapor-deposited layers thereon, is either aerated or annealed at a high temperature of, for example, 150–400° C., preferably with an oxygen-containing atmosphere. This process lasts for several hours. It is possible to aerate as well as to anneal.

After these operations the dielectric 9, preferably by vapor-deposition of, for example, silicon oxide, and the covering electrode 10, preferably by vapor-deposition of an iron/nickel alloy, are provided. The vapor-deposition of the dielectric 9 takes place at a pressure of approximately $5\cdot10^{-5}$ torr and lasts for some 10 minutes, while the same pressure prevails during vapor-deposition of the covering electrode 10 in approximately one minute. Then the immersion tinning takes place. In this way the contact surfaces 4, 5, 6, 7 and the conductors 2, 3, received a tin coating 14.

All of the surface areas of this thin film circuit which are not to be tinned are covered with a protective coating of a known type, such as for example a thick chrome-containing metal layer or an oxide layer (silicon dioxide), which prevents tinning. Instead of a special protective coating it is also possible to cover those areas which are not to be tinned with a nickel/chrome layer 15 which, for example, is achieved simultaneously with the vapor-deposition of the resistances 11, 12.

Even better, for the manufacture of a thin film circuit having capacitors, is another embodiment of the invention according to which initially the iron/nickel for the conductors 2, 3, the contact surfaces 4, 5, 6, 7 and the base electrode 8 are vapor-deposited. Then the dielectric 9 is provided in a known manner. Thereafter, the covering electrode 10 is provided from iron/nickel alloy. Finally, the resistances 11, 12 and the monitor leaf 13 are vapor-deposited. At this time the vapor-depositing masks are formed in such a way that the covering electrode 10 of the capacitor is also provided with a nickel/chrome layer 15. This has the advantage that during the immersion tinning of the thin film circuit, the covering electrode 10 is not wetted by tin. As a result the capacitor remains curable. As was indicated above, by curable is meant that in the event of a short-circuit at predetermined locations of the capacitor surfaces, it is possible by passing current at these locations of the short-circuited portions to vaporize the layers. Instead of nickel/chrome it is also possible to provide on the tinnable covering electrode 10 of iron/nickel alloy, by way of an additional layering operation, other layers which are incapable of being wetted by tin. In this way, it is possible to vapor-deposit the resistances 11, 12 from the nickel/chrome alloy before providing the dielectric layer 9.

The manufacture of a resistance combination on the substrate 1 takes place in three vapor-depositing steps (without capacitor).

On the substrate 1 there are initially vapor-deposited in a high vacuum of approximately $5\cdot10^{-5}$ torr in a time of approximately 1 minute, the contact surfaces 6 and 7 for the contacts to be made at the monitor leaf 13 for the purpose of measuring of comparison resistances to control the surface resistance of the resistances present in the resistance combination during the subsequent vapor-deposition of the nickel/chrome alloy. The vapor-deposition of this layer takes place in the manner already described above.

The resistance value of the monitor leaf 13 is measured by placing test points on the contact surfaces 6, 7. In this way the resistance value of the vapor-deposited nickel/chrome alloy is determined, so that then the determination of the electrical resistance values of the individual vapor-deposited resistances of the resistance combination is possible (comparison measurement).

Then the conductors 2, 3 and contact surfaces 4, 5 made of iron/nickel alloy, are vapor-deposited. Thereafter the contact surfaces are tinned.

According to the method of the invention it is also possible to manufacture a resistance combination in only two vapor-depositing steps.

Thus, in the first vapor-depositing step, the conductors 2, 3, the contact surfaces 4, 5 and the contact surfaces for the monitor leaf 6, 7 are manufactured.

In the second vapor-depositing step the nickel/chrome alloy for the resistances 11, 12 and the monitor leaf 13 are vapor-deposited.

The above-described method of the invention for manufacturing of resistance combinations and thin film circuits with capacitors makes it possible, by the choice of the layer materials and by the sequence of layering to provide for annealing of the resistances and capacitors at the end of the manufacturing operations. This had the advantage that when carrying out the vacuum-layering operations, the resistance combinations and the thin film circuit can be manufactured without interruption of the vacuum.

What is claimed is:

1. In a method of manufacturing an electrical thin film circuit and resistance combination, the step of vapor-depositing in a vacuum onto a non-conductive substrate which is at a temperature of approximately 300° C., conductors, contact surfaces, and the base electrode and covering electrode of a capacitor from a material having a composition of approximately 45–50% iron and 50–55% nickel.

2. In a method as recited in claim 1 wherein said composition consists of 50% iron and 50% nickel.

3. In a method as recited in claim 1 and wherein said electrically non-conductive substrate is of glass.

4. In a method as recited in claim 1, the step of directing oxygen to the iron/nickel layers with the latter in a heated condition at a temperature of 150–300° C.

5. In a method as recited in claim 1, covering at least part of the iron/nickel layers with solder having a substantial amount of tin, the solder-covered layers having a minimum thickness in the region of 90–120 nm.

6. In a method as recited in claim 1, wherein simultaneously with the vapor-depositing operation where the conductors, contact surfaces and electrodes for the capacitor are vapor-deposited, the contact surface for monitor plates are vapor-deposited from the same iron/nickel alloy.

7. In a method as recited in claim 1, depositing on said covering electrode of the capacitor a coating which is not wettable by solder.

8. In a method as recited in claim 1, depositing on said substrate, resistance layers of nickel/chrome alloy after the layers for the conductors, contact surfaces, base electrode, covering electrode, and a dielectric situated therebetween have been deposited, and then depositing a layer of nickel/chrome alloy on the covering electrode through a masking device apertured at the covering electrode.

9. In a method as recited in claim 1, carrying out an annealing operation as the last step of the vacuum operations.

10. In a method as recited in claim 1, carrying out an annealing operation after the last step of the vacuum operation has been completed.

11. In a method as recited in claim 1, performing in any sequence the steps of depositing layers of nickel/chrome alloy for resistances and depositing at least one layer of iron/nickel alloy, and then heating the substrate to a temperature of 150–400° C.

12. In a method as recited in claim 11, heating said substrate in a vacuum.

13. In a method as recited in claim 11, heating said substrate in an oxygen-containing atmosphere.

14. In a method as recited in claim 13, the step of removing the oxide layer on the iron/nickel alloy resulting from heating in the oxygen-containing atmosphere by means of a liquid solvent medium.

15. In a method as recited in claim 11, subsequent to the heating, covering at least some of the iron/nickel layers with solder containing a substantial amount of tin, said solder-covered layers having a minimum thickness of 120 nm.

16. An article comprising an electrically non-conductive substrate having an electrical thin film circuit adhered thereto, the improvement wherein the conductors, contact surfaces, and capacitor electrodes consist of layers of an iron/nickel composition having a ratio of 45–50% iron to 50–55% nickel.

17. The article of claim 16 wherein said composition has a ratio of 50% iron to 50% nickel.

18. The article of claim 16 wherein said iron/nickel layers have a thickness in the range of 90 to 120 nm.

19. The article of claim 16 wherein said iron/nickel layers have a thickness in the range of 90–120 nm.

20. The article of claim 16 wherein said substrate is selected from the group of glass, ceramic and plastic material.

21. The article of claim 20 wherein said circuit includes resistances and a monitor leaf consisting of nickel/chrome alloy layers.

22. The article of claim 21 wherein said nickel/chrome alloy layers are annealed.

23. The article of claim 22 wherein the covering electrode of said capacitor includes a surface layer of nickel/chrome alloy.

References Cited

UNITED STATES PATENTS

| | | | |
|---|---|---|---|
| 3,248,681 | 4/1966 | Reintgen | 317—234 |
| 3,213,826 | 10/1965 | Lins et al. | 117—107 X |
| 3,102,048 | 8/1963 | Gran et al. | 117—107 X |
| 3,065,105 | 11/1962 | Pohm | 117—107 X |
| 2,900,282 | 8/1959 | Rubens | 117—107 X |

ALFRED L. LEAVITT, Primary Examiner

A. GRIMALDI, Assistant Examiner

U.S. Cl. X.R.

117—217; 252—519; 317—234